United States Patent Office 3,390,207
Patented June 25, 1968

3,390,207
METHOD OF MAKING BLOCK COPOLYMERS
OF DIENES AND VINYL ARYL COMPOUNDS
Fred Dudley Moss, Long Beach, and Joseph F. Mathews, Hawthorne, Calif., assignors to Shell Oil Company, New York, N.Y., a corporation of Delaware
No Drawing. Filed Oct. 28, 1964, Ser. No. 407,241
4 Claims. (Cl. 260—879)

ABSTRACT OF THE DISCLOSURE

A process for making block polymers of the configuration A—B—A wherein each A is a polymer block of a monovinyl substituted aromatic compound and B is a polymer block of a conjugated diene wherein the first block A is formed with a lithium alkyl catalyst in the presence of a $C_{6-7}$ cyclic hydrocarbon solvent under adiabatic conditions and there is then added a conjugated diene and a $C_{4-5}$ open chain hydrocarbon solvent and polymerization is continued under reflux.

---

This invention is concerned with the preparation of certain block copolymers. More specifically, the invention is directed to processes for the preparation of block copolymers having an improved uniformity of composition.

The preparation of block copolymers has developed primarily in the last few years. Several alternative processes have been investigated, dependent in part upon the quality of the products desired and the catalyst systems capable of forming these block copolymer products. One of the more interesting types of block copolymers is that prepared from monovinyl-substituted aromatic compounds such as styrene and from conjugated dienes such as isoprene or butadiene. While these block copolymers may have any number of blocks each having a differing identity from the adjacent blocks in the polymer chain, the type with which the present invention is concerned is that having the structure

A—B—A wherein each of the blocks A is a polymer block of a monovinyl-substituted aromatic compound and B is a polymer block of a conjugated diene. Two typical block copolymers of this type are polystyrene-polyisoprene-polystyrene and polystyrene - polybutadiene - polystyrene. These products may be hydrogenated subsequent to their formation for the purpose of improving their stability toward oxidative degradation and for improving their service temperatures due to an increase in their softening point upon hydrogenation.

A number of undesirable side reactions may occur during the formation of such block copolymers, particularly if the objective is to obtain an essentially "pure" block copolymer of the structure

A—B—A

The more "pure" this product is, in this respect, the more striking its properties may be. For example, one of the peculiarities of this type of composition is that it can be regarded as a "self-curing" elastomer in that, under suitable molecular weight conditions and purity of product, the copolymer has some of the properties of a vulcanized rubber and, can be utilized for elastomeric purposes without requiring any vulcanization treatment. However, the more diluents (e.g., other polymeric species) there are in the product, the poorer its physical properties are relative to tensile strength, elongation at break, softening point, and other characteristics.

One of the greatest difficulties in the preparation of block copolymers having the A—B—A structure is to prevent or minimize the premature termination of the living polymer chains due to one of two principal influences. These are in the first place polymer die-out due to thermal termination and, secondly, polymer die-out (or very slow propagation) due to precipitation from the polymerization medium. The problem, therefore, is to maintain the polymerizing mixture in a homogeneous state and at the same time to maintain a suitable temperature environment which will minimize termination of the growing polymer chains. In serious cases of die-out, a substantial proportion of the product may be homopolymer such as polystyrene or a two-block polymer such as polystyrene-polyisoprene. While each of these particular products may be useful when in the correct molecular weight range, they do not in fact meet the desired qualities of performing like a vulcanized rubber such as is desired in the A—B—A block copolymer product. Consequently, their presence in the product is regarded as undesirable in the present instance.

It is an object of the present invention to provide an improved process for block copolymer formation. It is a further object of the invention to provide a block copolymerization process wherein polymer die-out is held at a minimum. It is a further object of the invention to provide an improved copolymerization process wherein the product derived is largely uncontaminated with homopolymers or polymers comprising only two polymer blocks. Other objects will become apparent during the following detailed description of the invention.

Now, in accordance with the present invention, a process for the preparation of A—B—A block copolymers is provided wherein polymer die-out is minimized by a selected solvent sequence during the formation of the several polymer blocks; also, temperature is controlled effectively by this sequence of solvent selection. More specifically, the process involves sequential block formation in the presence of an alkyl lithium polymerization catalyst, the two types of polymerization monomers being monovinyl substituted aromatic compounds and conjugated dienes. Broadly, the process comprises the steps of initially forming a polymer block of a vinyl substituted-aromatic compound in the presence of the lithium alkyl catalyst, thereafter adding a conjugated diene monomer and continuing polymerization to form the intermediate polymer product A—B—Li, e.g., a living polymer; and finally adding a second portion of a vinyl substituted-aromatic compound to form the third polymer block. The invention comprised the critical selection of a cyclic hydrocarbon solvent having from 6-7 carbon atoms per molecule for use in the formation of the first polymer block and conducting this first polymer block polymerization in an adiabatic manner such that essentially no refluxing of solvent occurs and such that the polymer block so formed is maintained substantially dissolved in the cyclic hydrocarbon medium. The second aspect of the present invention comprises the addition of a $C_{4-5}$ open chain hydrocarbon during the second stage in the copolymerization process wherein the conjugated diene is block polymerized with the previously formed vinyl arene block.

The temperature requirement during the formation of the conjugated diene polymer block necessitates refluxing of the polymerization mixture under such conditions that at least the $C_{4-5}$ hydrocarbon refluxes and effects temperature control.

The use of this dual solvent system added as described satisfies the primary requirement of minimizing or eliminating polymer die-out due either to thermal termination or to precipitation in the polymerization medium.

The choice of the particular class of catalysts, namely alkyl lithium has been made in view of the findings that other potential catalysts for block copolymer preparation do not yield the same superior products. For example, the block copolymers may be made by the use of a dilithium catalyst such as dilithium naphthalene and the like, forming a di-initiated polymer block of the conjugated diene and thereafter adding the monovinyl substituted aromatic compound to form the A—B—A product. However, it has been found that the cis-trans structure of the center block formed by this latter process is undesirable and secondly that the polymer die-out may be excessive.

The conjoint addition of both the cyclic hydrocarbon solvent, e.g., cyclohexane and an open chain hydrocarbon solvent such as mixed pentanes prior to formation of the first block A was considered but it was found that the rate of polymerization at the temperature required to effect reflux of the open chain hydrocarbon solvent was excessive and that product and process control were therefore difficult. In other words, the presence of the lower molecular weight open chain hydrocarbon solvents calls for a more or less uniform temperature while it is present, the temperature control being effected by refluxing of the lowest boiling solvent or mixture of solvents in the polymerization medium. This likewise was found to be undesirable since at the temperature of reflux the rate of polymerization was so fast that molecular weight control was difficult if not impossible. Since molecular weight control for specific properties is essential, it was therefore desirable to eliminate the open chain hydrocarbon solvents from the formation of the first block A.

On the other hand, the second block conjugated dienes were found to polymerize at a substantially lower rate than the monovinyl arenes. However, the polymerized monovinyl arenes are not reasonably soluble in open chain hydrocarbon media. Consequently, it was desirable to modify the reaction medium so as to accommodate the solubility limitations of the block copolymer which would eventually have a diene polymer block and at the same time to provide for relatively elevated temperature control to accelerate the rate of polymerization.

Consequently, in accordance with the present invention and subsequent to the formation of the first polymer block A, the diene monomer was added and the reaction medium modified by the supplementary addition of a $C_{4-5}$ open chain hydrocarbon. The formation of the diene polymer block was then effected under reflux conditions such that the $C_{4-5}$ open chain hydrocarbon was refluxing actively with some of the previously present cyclic hydrocarbon probably refluxing together therewith. In order to provide proper solubility of the block copolymer, it is necessary to restrict the total reaction mixture to between about 30 and about 60 (preferably 40–50) volume per cent of the open chain $C_{4-5}$ hydrocarbon.

The vinyl aromatic compounds from which the end blocks A may be formed include particularly one or more monovinyl aromatic hydrocarbon of the benzene series, such as styrene, vinyl toluene, vinyl xylene, ethyl vinyl xylene, vinyl naphthalene and the like. The conjugated dienes from which the center diene polymer blocks are derived are those having from 4–8 carbon atoms per molecule including especially butadiene, isoprene, methyl isoprene, and their homologues. Mixtures of the individual polymer forming monomers may be utilized in the preparation of the subject block copolymers.

The alkyl lithium compounds employed in the present process include especially those having from 1–8 carbon atoms per molecule and preferably from 4–6 carbon atoms per molecule. Branched chain and especially secondary alkyl lithium compounds are preferred since the secondary alkyl lithium has been found to form the most desirable type of polymers. This is due in part at least to the minimum "induction period" experienced with this type of catalyst which in turn minimizes the spread in molecular weight of the individual polymer blocks. The preferred catalysts is secondary butyl lithium and secondary amyl lithium may be employed in addition to or in place thereof.

Polymerization is normally conducted at temperatures suitable for reasonable control over molecular weight for each individual polymer block. This is not to say that polymerization cannot be conducted at higher or lower temperatures. On the contrary, it is possible to polymerize styrene rapidly with alkyl lithium catalysts over a wide range of temperatures, but the close control of molecular weight of the polymer block is essential in forming the block polymer having optimum physical properties with which the present invention is concerned.

To this end, therefore, the temperature of polymerization in the formation of the first polymer block of a monovinyl substituted arene is to be restricted to between about 20° C. and about 60° C., the preferred practice being to conduct the first block polymerization adiabatically, starting at temperatures in the order of 20–30° C. and permitting the heat of reaction to raise the temperature of the polymerization mass up to the maximum temperature in the order of 55–60° C. This will occur over the reaction time, the maximum temperature being reached quickly after which the temperature tends to decrease somewhat because of heat loss over the course of the first block polymerization which will take from about 20 minutes to about 1 hour. During this period, essentially no effective refluxing occurs due to the choice of solvent and the adiabatic reaction which is started at 20–30° C.

The solvents useful for this purpose are essentially non-polymerizable cyclic hydrocarbons which may be either saturated or unsaturated. Staturated hydrocarbons are preferred and of these cyclohexane is optimum. However, unsaturated cyclic hydrocarbons such as benzene or alkylated benzene may be employed for this purpose. Alkylated cyclopentanes may be used as well. The objective is to choose a polymerization medium containing at least a major proportion of, e.g., over 50% by weight of at least one of the cyclic hydrocarbon solvents such that the first polymer block of the monovinyl arene is essentially soluble therein or forms no precipitate other than a very loose gel which is closely associated with the solvent and does not in effect precipitate therefrom.

The proportion of solvent employed for this purpose will vary with the specific working conditions and monomer utilized but normally will be between about 5 and 15 times the weight of the styrene initially present.

It has been found in accordance with one aspect of the present invention that the polymerization of styrene by means of alkyl lithium catalysts is so rapid as to prevent close control of molecular weight of the product if the polymerization is conducted at too high a temperature throughout the course of polymerization.

Consequently, recognizing this fact, the block polymerization is conducted adiabatically starting at relatively low temperatures, preferably ambient room temperature, allowing the temperature to rise without employing a refluxing solvent, e.g., a solvent of such boiling point that it would reflux under the temperature conditions existing.

The monomer for the center block of polymerized conjugated dienes is mixed with the solution of the previous polymerized block A together with an amount of open-chain hydrocarbons sufficient to provide enough vapor pressure for reflux cooling but not so much as to cause the formation of a separate phase from the cyclohexane-polystyrene living polymer block.

The open chain hydrocarbon utilized for this purpose must not only be a solvent for the diene monomer and (together with the cyclic hydrocarbon solvent already present) form a combined solvent for the growing polymer chains, but also must be one capable of refluxing under the controlled temperature and pressure conditions of the polymerization. Thus, the open chain hydrocarbons having from 4–5 carbon atoms which may be either alkanes or alkenes having from 4–5 carbon atoms per molecule are particularly effective for this purpose. The admixture of the polymerizing components is made under such condition as to accelerate continued polymerization of the diene on the living end of the polymer chain (block A). Consequently, an initial temperature when polymerizing the diene block in the order of at least about 40° C. and preferably 45° C. is desirable and optimum temperatures are in the order of 50–55° C.

Shortly after introduction of the open chain hydrocarbon and diene monomer, the temperature rises sharply and the open chain hydrocarbon commences refluxing. Within a very short time, the cooling effect of the refluxing solvent reduces the temperature to a reasonably steady level in the order of 10–15° C. higher than the initial temperature and polymerization is continued until substantially all of the monomer has been consumed, a period of time in the order of 0.5–5 hours, preferably 1–2 hours.

The proportion of open chain $C_{4-5}$ hydrocarbon employed for the present purpose should be between about 40 and about 50 volume percent based on the total polymerization mixture in order to provide not only the required solubility characteristics for the growing polymer chain but also sufficient temperature control by means of reflux.

The second terminal block A of the monovinyl substituted arene is formed subsequent to polymerization of substantially all of the diene monomer injected into the polymerization vessel. Since the intermediate living polymer present at this time has the structure A—B—Li

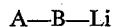

where A is a poly(vinylarene) block and B is a poly(conjugated diene) block, the added vinyl arene monomer continues to polymerize on the living (lithium) end of the intermediate. The temperature rises only slightly during this stage of the polymerization and preferably is held to within about 50–60° C., preferably at about 55°. The time of polymerization will vary with the molecular weight desired, which is controlled, in turn, by the amount of monomer added relative to the number of growing polymer chains but normally will be between about 0.5 and 2.5 hours.

After the block copolymerization is complete, the polymer chains may be terminated by the addition of a chain terminator such as an alcohol, preferably methanol or propanol. The cement constituting the mixture of solvents and block copolymer may be treated now in any desirable manner, these stages not forming an essential part of the process of the present invention. For example, the cement may be used per se as a additive to other elastomeric materials such as polyisoprene; may be modified with pigments such as carbon black or titanium dioxide and thereafter coagulated or may be coagulated in steam and/or hot water to form a gum elastomer.

The following examples illustrate the advantages gained by the use of the present invention contrasted to block copolymerization under less desirable alternative conditions:

Example I.—Process outside the present invention

A block copolymer was made by first polymerizing styrene in cyclohexane solvent to form a living polystyrene polymer block of 15,000 molecular weight. To this was added sufficient isoprene in isopentane solvent to make a living two-segment block copolymer of 150,000 molecular weight. To this was added enough styrene monomer to attempt making a three-segment block copolymer of 175,000 average molecular weight. At this point the solvent mixture was about 10% cyclohexane and 90% isopentane and the temperature was 55° C. After only 24% of the third block styrene had reacted, the polymer apparently precipitated and the reaction for all practical purposes died. Actually, the reaction was still proceeding but at a rate some twenty times slower than before the precipitation. The copolymer at the time of the die-out was an undesirable "two-segment" block copolymer with insufficient styrene in the third segment to give the conventional properties of a three-segment A—B—A copolymer.

Example II.—Process outside the present invention

A block copolymer was made by first polymerizing styrene in cyclohexane solvent to form a living polystyrene block of 13,200 molecular weight. To this was added sufficient isoprene in cyclohexane solvent to make a living two-segment block copolymer of 159,000 molecular weight. At this point the temperature, which had been 56° C., rose rapidly to 90° C. and full cooling in the reactor jacket was ineffective in lowering this back to 65° C. until 35 minutes later after most of the reaction had taken place. This period at excessively high temperatures resulted in thermal deactivation of approximately 40% of the living polymer chains so that the third block styrene added to only 60% of the two-segment polymer chains. The resulting product when processed without any additional compounding ingredients into a test specimen had a tensile strength at break of only 1,100 p.s.i.

Example III.—Process of this invention

A block copolymer was made by first polymerizing styrene in cyclohexane solvent under adiabatic conditions, starting at about 25° C., to form a living polystyrene polymer of 14,000 molecular weight. To this was added sufficient isoprene in a mixture of cyclohexane and isopentane to make a living two-segment block copolymer of 146,000 molecular weight. The temperature immediately after the addition was 48° C. The temperature rose sharply to 55° C., the set point of the temperature controller, at which time condensation of the reaction overhead vapor was effected. Vapor was condensed and reflux returned to the reacting mass at a controlled rate such that the temperature was held at 55° C. throughout the course of the reaction. To this was added enough styrene monomer to make a three-segment block copolymer of 174,000 molecular weight. The resulting product when processed without any additional compounding ingredients into a test specimen had a tensile strength at break of 3,200 p.s.i.

We claim:

1. In the process for the preparation of a block copolymer having the general configuration

A—B—A

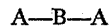

wherein each A is a polymer block of a monovinyl-substituted aromatic compound and B is a polymer block of a conjugated diene, wherein the first block A is formed in the presence of a lithium alkyl catalyst, conjugated diene is thereafter added, polymerization is continued to form the intermediate polymer A—B—Li

thereafter further proportions of vinyl aromatic compound are added and polymerization continued to form the A—B—A polymer, the improvement comprising forming the first block A under adiabatic conditions essentially free of refluxing at a temperature of from 20° C. to 60° C. in the presence of a polymerization solvent comprising a major proportion of cyclohexane, said solvent during the formation of block A being unreactive and essentially free of components having boiling points lower than that of cyclohexane; thereafter adding conjugated diene and 30 to 60% volume of $C_5$ open-chain unreactive hydrocarbon solvent and continuing polymerization under reflux conditions.

2. A process according to claim 1 wherein the open chain solvent is pentanes.

3. A process according to claim 1 wherein the open chain solvent is amylenes.

4. In the process for the preparation of a block copolymer of styrene and isoprene having the general configuration polystyrene-polyisoprene-polystyrene wherein styrene is polymerized in the presence of an alkyl lithium polymerization catalyst to form a first polystyrene block A, isoprene is added and polymerization is continued to form an intermediate polymer polystyrene-polyisoprene-Li, thereafter adding a further amount of styrene and continuing the polymerization to form the block copolymer, the improvement comprising conducting the formation of block A under adiabatic temperature conditions essentially free of refluxing at a temperature of from 20° C. to 60° C. in the presence of a polymerization solvent comprising a major proportion of cyclohexane, said solvent during the formation of block A being essentially free of components having a boiling point lower than that of cyclohexane; thereafter adding isoprene and 40 to 50% volume of pentanes and continuing polymerization under reflux conditions.

References Cited
UNITED STATES PATENTS 3,231,635  1/1966  Holden et al. _____ 260—879

GEORGE F. LESMES, *Primary Examiner.*

SAMUEL H. BLECH, *Examiner.*

T. G. FIELD, JR., *Assistant Examiner.*